US009924351B2

(12) United States Patent
Wijayanathan et al.

(10) Patent No.: US 9,924,351 B2
(45) Date of Patent: Mar. 20, 2018

(54) ACCOMMODATING HYBRID IPV4V6 NETWORK SUPPORT

(71) Applicant: BlackBerry Limited, Waterloo (CA)

(72) Inventors: Maiyuran Wijayanathan, Waterloo (CA); Noushad Naqvi, Waterloo (CA); Claude Jean-Frederic Arzelier, Molières-sur-Cèze (FR)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/392,567

(22) Filed: Dec. 28, 2016

(65) Prior Publication Data

US 2017/0127271 A1    May 4, 2017

Related U.S. Application Data

(63) Continuation of application No. 12/855,540, filed on Aug. 12, 2010, now abandoned.

(Continued)

(51) Int. Cl.
*H04W 8/26* (2009.01)
*H04L 29/06* (2006.01)
(Continued)

(52) U.S. Cl.
CPC .......... *H04W 8/26* (2013.01); *H04L 61/6059* (2013.01); *H04L 69/16* (2013.01); *H04L 69/167* (2013.01);
(Continued)

(58) Field of Classification Search
CPC ... H04L 61/6059; H04L 69/16; H04L 69/167; H04W 36/0033; H04W 76/04; H04W 80/045; H04W 8/26
See application file for complete search history.

(56) References Cited

U.S. PATENT DOCUMENTS

2005/0105544 A1   5/2005   Pirskanen et al.
2006/0063544 A1   3/2006   Zhao et al.
(Continued)

FOREIGN PATENT DOCUMENTS

| EP | 1773013 A2 | 4/2007 |
| EP | 1912385 A1 | 4/2008 |
| EP | 1928143 A1 | 6/2008 |

OTHER PUBLICATIONS

3GPP TS 22.101 V10.3.0; 3rd Generation Partnership Project; Technical Specification Group Services and System Aspects; Service Aspects; Service Principles; Release 10; Jun. 2010; 60 pages.

(Continued)

*Primary Examiner* — Ian N Moore
*Assistant Examiner* — Mewale Ambaye
(74) *Attorney, Agent, or Firm* — Conley Rose, P.C.; J. Robert Brown, Jr.; Albert A. Abbou

(57) ABSTRACT

A user equipment (UE) is provided. The UE comprises at least one component that is configured to detect an event of one of the UE changing routing area and the UE changing radio access technology from a long-term evolution (LTE) network to a global system for mobile communications enhanced data rates for GSM evolution radio access network (GERAN) or to a universal mobile telecommunication system terrestrial radio access network (UTRAN) and, responsive to detecting the event, to deactivate one of a packet data protocol (PDP) context and an evolved packet system (EPS) bearer.

20 Claims, 6 Drawing Sheets

Related U.S. Application Data

(60) Provisional application No. 61/233,355, filed on Aug. 12, 2009.

(51) Int. Cl.
*H04L 29/12* (2006.01)
*H04W 36/00* (2009.01)
*H04W 76/04* (2009.01)
*H04W 80/04* (2009.01)

(52) U.S. Cl.
CPC ........ *H04W 36/0033* (2013.01); *H04W 76/04* (2013.01); *H04W 80/045* (2013.01)

(56) References Cited

U.S. PATENT DOCUMENTS

| | | | |
|---|---|---|---|
| 2008/0130594 A1 | 6/2008 | Suzuki | |
| 2008/0267154 A1* | 10/2008 | Johansson | H04W 76/027 370/338 |
| 2009/0147670 A1* | 6/2009 | Hu | H04L 12/4633 370/216 |
| 2009/0252072 A1 | 10/2009 | Lind et al. | |
| 2010/0232386 A1 | 9/2010 | Dong | |
| 2011/0013614 A1 | 1/2011 | Chen | |
| 2011/0038372 A1 | 2/2011 | Wijayanathan et al. | |

OTHER PUBLICATIONS

3GPP TS 23.060 V8.4.0; 3rd Generation Partnership Project; Technical Specification Group Services and System Aspects; General Packet Radio Service (GPRS); Service Description; Stage 2; Release 8; Mar. 2009; 276 pages.
3GPP TS 23.251 V9.2.0; 3rd Generation Partnership Project; Technical Specification Group Services and System Aspects; Network Sharing; Architecture and Functional Description; Release 9; Mar. 2010; 20 pages.
3GPP TS 23.401 V8.5.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 8; Mar. 2009; 223 pages.
3GPP TS 24.008 V8.5.0; 3rd Generation Partnership Project; Technical Specification Group Core Network and Terminals; Mobile Radio Interface Layer 3 Specification; Core Network Protocols; Stage 3; Release 8; Mar. 2009; 581 pages.
3GPP TS 24.301 V8.1.0; 3rd Generation Partnership Project; Technical Specification Group Core Network and Terminals; Non-Access-Stratum (NAS) Protocol for Evolved Packet System (EPS); Stage 3; Release 8; Mar. 2009; 250 pages.
3GPP TS 24.301 V8.2.1; 3rd Generation Partnership Project; Technical Specification Group Core Network and Terminals; Non-Access-Stratum (NAS) Protocol for Evolved Packet System (EPS); Stage 3; Release 8; Jun. 2009; 252 pages.
3GPP TS 25.331 V8.6.0; 3rd Generation Partnership Project; Technical Specification Group Radio Access Network; Radio Resource Control (RRC); Protocol Specification; Release 8; Mar. 2009; 1673 pages.
3GPP TS 25.331 V8.7.0; 3rd Generation Partnership Project; Technical Specification Group Radio Access Network; Radio Resource Control (RRC); Protocol Specification; Release 8; Jun. 2009; 1685 pages.
3GPP TS 25.322 V9.2.0; 3rd Generation Partnership Project; Technical Specification Group Radio Access Network; Radio Link Control (RLC) Protocol Specification; Release 9; Jun. 2010; 88 pages.
3GPP TS 36.331 V8.5.0; 3rd Generation Partnership Project; Technical Specification Group Radio Access Network; Evolved Universal Terrestrial Radio Access (E-UTRA); Radio Resource Control (RRC); Protocol Specification; Release 8; Mar. 2009; 204 pages.
3GPP TS 44.018 V8.6.0; 3rd Generation Partnership Project; Technical Specification Group GSM/EDGE Radio Access Network; Mobile Radio Interface Layer 3 Specification; Radio Resource Control (RRC) Protocol; Release 8; Feb. 2009; 421 pages.
3GPP TS 44.018 V8.7.0; 3rd Generation Partnership Project; Technical Specification Group GSM/EDGE Radio Access Network; Mobile Radio Interface Layer 3 Specification; Radio Resource Control (RRC) Protocol; Release 8; May 2009; 423 pages.
3GPP TS 44.060 V8.4.0; 3rd Generation Partnership Project; Technical Specification Group GSM/EDGE Radio Access Network; General Packet Radio Service (GPRS); Mobile Station (MS)—Base Station System (BSS) Interface; Radio Link Control/Medium Access Control (RLC/MAC) Protocol; Release 8; Feb. 2009; 589 pages.
3GPP TS 44.060 V8.5.0; 3rd Generation Partnership Project; Technical Specification Group GSM/EDGE Radio Access Network; General Packet Radio Service (GPRS); Mobile Station (MS)—Base Station System (BSS) Interface; Radio Link Control/Medium Access Control (RLC/MAC) Protocol; Release 8; May 2009; 587 pages.
3GPP TS 44.065 V9.0.0; 3rd Generation Partnership Project; Technical Specification Group Core Network and Terminals; Mobile Station (MS)—Serving GPRS Support Node (SGSN); Subnetwork Dependent Convergence Protocol (SNDCP); Release 9; Dec. 2009; 52 pages.
3GPP TSG-SA2 Meeting #75; "Change of Network PDP Type at Change from LTE to 2G/3G or Within 2G/3G"; S2-095072; Kyoto, Japan; Aug. 31-Sep. 4, 2009; 4 pages.
3GPP TSG CT WG4 Meeting #44; "Dual Stack Support in GTPv1"; C4-092066; Los Angeles, US; Jun. 22-26, 2009; 26 pages.
3GPP TSG-SA WG2 Meeting #72; "Cleanup Inter RAT Handover and Multiple PDN Support"; S2-092181; Hangzhou, China; Mar. 30-Apr. 3, 2009; 36 pages.
3GPP TSG CT WG1 Meeting #57; "Update the PDN Type with IPv4v6"; C1-091302; San Antonio, TX USA; Feb. 9-19, 2009; 12 pages.
Office Action dated May 11, 2012; U.S. Appl. No. 12/855,540 filed Aug. 12, 2010; 26 pages.
Final Office Action dated Aug. 31, 2012; U.S. Appl. No. 12/855,540 filed Aug. 12, 2010; 25 pages.
Advisory Action dated Nov. 13, 2012; U.S. Appl. No. 12/855,540 filed Aug. 12, 2010; 3 pages.
Office Action Action dated Feb. 4, 2014; U.S. Appl. No. 12/855,540 filed Aug. 12, 2010; 24 pages.
Final Office Action Action dated May 28, 2014; U.S. Appl. No. 12/855,540 filed Aug. 12, 2010; 22 pages.
PCT International Search Report; Application No. PCT/GB2010/001534; dated Apr. 5, 2011; 7 pages.
PCT Written Opinion of the International Searching Authority; Application No. PCT/GB2010/001534; dated Apr. 5, 2011; 12 pages.
Canadian Office Action; Application No. 2,770,630; Aug. 20, 2013; 3 pages.
Canadian Office Action; Application No. 2,770,630; dated Aug. 25, 2014; 4 pages.
Canadian Office Action; Application No. 2,770,630; dated Jul. 27, 2015; 5 pages.
Chinese Office Action; Application No. 201080046007.7; dated Apr. 2, 2014; 20 pages.
Chinese Office Action; Application No. 201080046007.7; dated Dec. 16, 2014; 18 pages.
Chinese Office Action; Application No. 201080046007.7; dated Apr. 30, 2015; 18 pages.
Chinese Office Action; Application No. 201080046007.7; dated Oct. 8, 2015; 22 pages.
European Examination Report; Application No. 10747654.1; dated Jun. 6, 2016; 5 pages.

\* cited by examiner

ACCOMMODATING HYBRID IPV4V6 NETWORK SUPPORT

CROSS-REFERENCE TO RELATED APPLICATIONS

This application is a continuation of U.S. patent application Ser. No. 12/855,540 filed on Aug. 12, 2010, "Accommodating Hybrid IPv4v6 Network Support" which is now abandoned which claims priority to U.S. Provisional Patent Application No. 61/233,355 filed on Aug. 12, 2009, "Accommodating Hybrid IPv4v6 Network Support", all of which are incorporated by reference herein as if reproduced in their entirety.

BACKGROUND

As used herein, the terms "user equipment" and "UE" might in some cases refer to mobile devices such as mobile telephones, personal digital assistants, handheld or laptop computers, and similar devices that have telecommunications capabilities. Such a UE might consist of a UE and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE) and LTE-Advanced (LTE-A). For example, an LTE or LTE-A system might include an Evolved Universal Terrestrial Radio Access Network (E-UTRAN) node B (or eNB), a wireless access point, or a similar component rather than a traditional base station. As used herein, the term "access node" refers to any component of the wireless network, such as a traditional base station, a wireless access point, or an LTE or LTE-A node B or eNB, that creates a geographical area of reception and transmission coverage allowing a UE or a relay node to access other components in a telecommunications system. In this document, the term "access node" and "access device" may be used interchangeably, but it is understood that an access node may comprise a plurality of hardware and software.

The signals that carry data between UEs and access nodes can have frequency, time, and coding parameters and other characteristics that might be specified by a network node. A connection between any of these elements that has a specific set of such characteristics can be referred to as a resource. A connection may be established by a single radio link, such as in the case of an E-UTRAN, or by one or more radio links, such as in the case of a Universal Terrestrial Radio Access Network (UTRAN). A network node typically establishes a different resource for each UE or other network nodes with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
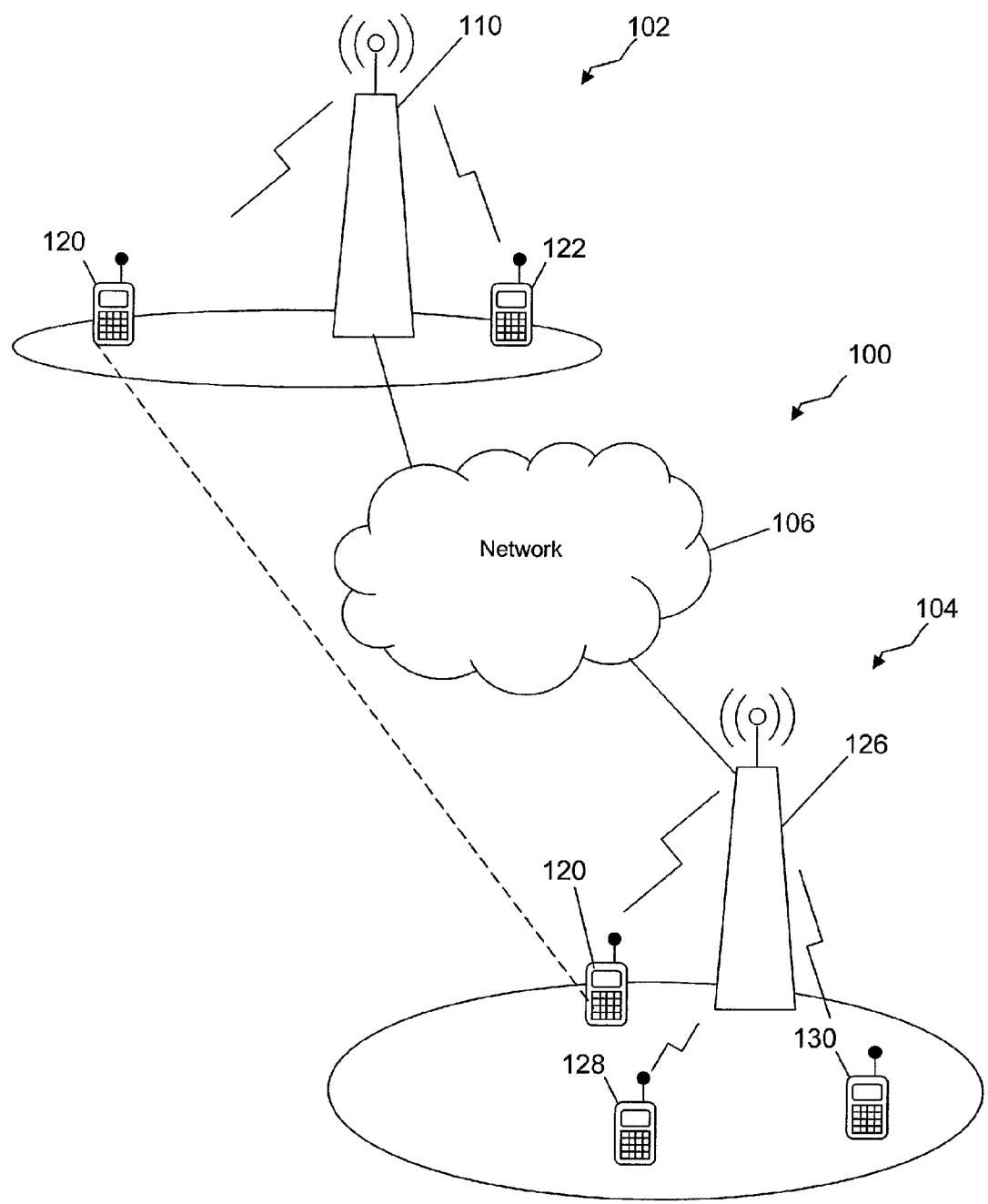
FIG. 1 is an illustration of a communication network according to an embodiment of the disclosure.

Turning to FIG. 1, a communication system 100 is now described. The system 100 comprises a first wireless coverage area 102, a second wireless coverage area 104, and a network 106 that couples the communication between the coverage areas 102, 104. A first access node 110 serves the first wireless coverage area 102 and provides wireless links to a first user equipment (UE) 120 and a second UE 122. A second access node 126 serves the second coverage area 104 and provides wireless links to a third UE 128 and a fourth UE 130. The second access node 126 further is shown providing a wireless link to the first UE 120, for example after the UE 120 has been handed off from the first coverage area 102 to the second coverage area 104. Alternatively, the UE 120 may have been handed off from the second coverage area 104 to the first coverage area 102. While the description hereinafter refers primarily to the first UE 120, it is understood that the description of the interactions of the first UE 120 with the system 100 may apply equally to other UEs, for example to UEs 122, 128, 130.

In an embodiment, the communication system 100 may be provided based on a single wireless communication protocol or a plurality of wireless communication protocols. In an embodiment, the communication system 100 may comprise a long-term evolution (LTE) radio access network (RAN), a GSM EDGE RAN (GERAN), or a UMTS Terrestrial RAN (UTRAN). Alternatively, the communication system 100 may comprise a mixture of different RAN technologies. For example, in an embodiment, the first coverage area 102 may be associated with an LTE RAN and the second coverage area 104 may be associated with a GERAN. In another embodiment, the first coverage area 102 may be associated with an LTE RAN and the second coverage area 104 may be associated with a UTRAN. In another embodiment, the first coverage area 102 may be associated with a GERAN and the second coverage area 104 may be associated with a UTRAN. In another embodiment, the first coverage area 102 may be associated with a first routing area and the second coverage area 104 may be associated with a second routing area.

Shared Networks or equivalent public land mobile networks (PLMNs) may also be used, for example in an embodiment, the first coverage area 102 may be associated with a GERAN from a first PLMN and the second coverage area 104 may be associated with a GERAN from another PLMN. In another embodiment, the first coverage area 102 may be associated with an LTE RAN from a first PLMN and the second coverage area 104 may be associated with a UTRAN from another PLMN. It should be noted that the number of coverage area is not limited to two. For example a first coverage area may be associated with a GERAN from a first PLMN and a second coverage area may be associated with a UTRAN from this same first PLMN and a third coverage area may be associated with an LTE RAN from this same first PLMN and a fourth coverage area may be associated with a wireless LAN (e.g. IEEE 802.11) from this same PLMN and a fifth coverage area may be associated with a UTRAN from another PLMN.

As a UE moves about the system 100, for example the first UE 120, under different conditions, for example, but not by way of limitation, changing radio or propagation conditions experienced by the UE, network congestion, a network decision, or a combination thereof, the context associated with the UE may be handed off to the serving access node, for example from the first access node 110 to the second access node 126. A problem with the internet protocol addressing employed by the UE and the access node and/or the network can occur when the two access nodes use different radio access technologies and/or are in different routing areas. For example, in an embodiment the first UE 120 establishes an Evolved Packet System (EPS) bearer using hybrid internet protocol version 4 version 6 (IPv4v6) addressing to attach to an LTE network when served by the first access node 110. Later the first UE 120 is handed off to the second access node 126 that is associated with GERAN and the EPS bearer is translated to a PDP context. If a serving general packet radio service support node (SGSN) coupled to the second access node 126 does not support the hybrid IPv4v6 addressing, a data session of the first UE 120 will not be able to transmit or to receive data for an application relying on an addressing type not supported. In some circumstances, mobility within the same routing area, for example handing off from the first access node 110 to the second access node 126 within the same routing area and having the same radio access technology, may lead to the first UE 120 experiencing an incompatibility between IP addressing type of the PDP context of an application established while served by the first access node 110 and the IP addressing type supported by the second access node 126.

A similar problem may occur for other mixes of technology and/or when changing routing areas, for example in some cases where the SGSN coupled to the second access node 126 does not support the internet protocol addressing type set up when the first UE 120 established a data session via the first access node 110. If the initial context established via the first access point 110 specifies hybrid IPv4v6 addressing but the SGSN associated with the second access point 126 does not support hybrid IPv4v6 addressing, the problem can occur for an application executing on the first UE 120 relying on an addressing type not supported. If the initial context established via the first access point 110 specifies IPv4 addressing but the SGSN associated with the second access point 126 only supports IPv6 addressing, the problem can occur. If the initial context established via the first access point 110 specifies IPv6 addressing but the SGSN associated with the second access point 126 only supports IPv4 addressing, the problem can occur. Thus, the embodiments provide for handling cases when the IP support of the network remains unchanged from the time when the EPS bearer (or PDP context) is activated.

The present disclosure teaches several solutions to the problem of managing handoff of data sessions between access nodes that support different IP addressing types. A particular one or more of the solution alternatives may be selected based on specific operating conditions, configurations of the network 100, and/or final disposition of standards. In an embodiment, the first UE 120 may deactivate a PDP context or an evolved packet system (EPS) bearer, for example when the second access point 126 and/or the network coupled the second access point 126 does not support the IP addressing associated with the PDP context. The first UE 120 may deactivate the PDP context either implicitly or explicitly. Deactivating the PDP context explicitly means the first UE 120 sends a message explicitly notifying the network 106 of the deactivation of the PDP context; deactivating the PDP context implicitly means the first UE 120 deactivates the PDP context but sends no message to the network 106 notifying of this deactivation. In an embodiment, after explicit PDP context or EPS bearer deactivation, the first UE 120 may reactivate a PDP context or EPS bearer. For example, if the PDP context or EPS bearer was previously set-up with hybrid IPv4v6 addressing, then the first UE 120 may activate the PDP contexts for IPv4 and/or IPv6, separately, depending on what the application or applications executing on the first UE 120 need.

The first UE 120 may determine the incompatibility of IP addressing types by inference after determining that an excessive amount of time has passed since data was successfully transmitted and/or received by an application associated with the PDP context or using another event trigger. In an embodiment, this may be performed only when the associated application is effectively supposed to send/receive data (for example an application in the course of a file transfer), to avoid unnecessary deactivation/reactivation of the PDP context or EPS bearer. In some circumstances, the first UE 120 may have multiple applications executing and associated with different PDP contexts and/or EPS bearers and may draw inferences about the IP addressing type supported by the second access node 126 based on different behavior of the applications. For example, if a first application that is configured to employ IPv4 addressing experiences a data transfer time-out after migration from the first access node 110 to the second access node 126 while a second application that is configured to employ IPv6 addressing continues a data transfer, the first UE 120 may infer that the second access node 126 supports IPv6 addressing and does not support IPv4 addressing. In other circumstances, different inferences may be drawn. In an embodiment, the first UE 120 may deactivate a PDP context and/or EPS bearer after expiration of a timer and may reactivate a PDP context and/or EPS bearer using a single IP addressing type on a trial basis. If the subject application data transfer timer time-out recurs, the first UE 120 may again deactivate the PDP context and/or EPS bearer and reactivate a PDP context and/or EPS bearer using yet a different IP addressing type on a trial basis, until the data transfer succeeds or does not time out.

In another embodiment, the second access node 126 may send a mobility message to the first UE 120 that includes a designation of the IP addressing type supported by the second access node 126 and the SGSN associated with the second access node 126. In another embodiment, the second access node 126 may indicate the IP addressing type that it supports in a system information message that the second access node 126 broadcasts. PDP contexts associated with applications on the first UE 120 that are compatible with the IP addressing type supported by the second access node 126 may be continued; PDP contexts associated with applications on the first UE 120 that are incompatible with the IP addressing type supported by the second access mode 126 may be implicitly or explicitly deactivated, or reactivated separately for IPv4 and IPv6 as needed.

In an embodiment, the first UE 120 may detect that no data is being received and/or transmitted on the data connection via a wireless link with the second access point 126, for example after a handoff of the first UE 120 from the first access point 110 to the second access point 126. The first access point 110 may support LTE while the second access point 126 may support GERAN or UTRAN. Alternatively, the first access point 110 may be associated with a first routing area within a GERAN or UTRAN, and the second access point 126 may be associated with a second routing area within the GERAN or UTRAN.

The detection may be implemented using a timer on a per application basis. After the expiration of the timer, when no data has been transmitted or received, for example for a given PDP context or given EPS bearer, the first UE 120 may deactivate the PDP context or the EPS bearer. In an embodiment, the deactivation of the PDP context or the EPS bearer may be based on first determining that an application is expecting to transfer and/or receive data before deactivating the PDP context (for example an application in the process of transferring a file), to avoid unnecessarily deactivating the PDP context when no data is needed to be transferred or received by any application. In an embodiment, the first UE 120 may reactivate PDP contexts or EPS bearers corresponding to the application or applications linked to the previously deactivated PDP context or EPS bearer. For example, if the previous IP addressing type for a given PDP context or EPS bearer was hybrid IPv4v6, then the first UE 120 may activate PDP contexts or EPS bearer for IPv4 and IPv6 separately, as needed by the applications.

In an embodiment, during the course of the handoff of the UE 120 from the first access node 110 to the second access point 126, the second access point 126 may send one or more mobility messages to the UE 120 that incorporate an internet protocol version field (IP version field) that defines the IP addressing type supported by the second access point 126 and/or the by SGSN associated with the second access point 126. The IP version field may identify the IP addressing type as one of an IPv4 addressing type, an IPv6 addressing type, a hybrid IPv4v6 double addressing type, and a hybrid IPv4v6 single addressing type. A network that supports the hybrid IPv4v6 double addressing type permits the first UE 120 to request and receiver both IPv4 and IPv6 addresses in a single message exchange. A network that supports the hybrid IPv4v6 single addressing type requires the first UE 120 to request and receive the IPv4 address in a first message exchange and to request and receive the IPv6 address in an independent second message exchange, for example using two different PDP contexts via two independent PDP context activation procedures. A wide variety of specific embodiments for encapsulating the IP version field in the mobility messages is contemplated, some of which are more fully indicated elsewhere herein.

If the first UE 120 was configured for hybrid IPv4v6 type addressing, the first UE 120 may resume data transfer via the second access point 126 using the IP addressing type indicated by the IP version field in the mobility message, provided that this IP addressing type is compatible with the IP addressing type and/or IP version needed by the related application for this PDP context. For example, if the IP version field in the mobility message sent by the second access point 126 indicates that the second access node 126 is configured to support IPv4 addressing, the first UE 120 may resume data transfer using IPv4 addressing, for the related application is that compatible with IPv4 addressing. Alternatively, if the IP version field indicates that the second access node 126 is configured to support the IPv6 addressing, the first UE 120 may resume data transfer using IPv6 addressing, provided the related application is compatible with IPv6 addressing.

If the IP version field in the mobility message sent by the second access point 126 indicates that the second access node 126 is configured to support hybrid single IPv4v6 type addressing, the first UE 120 may deactivate the PDP contexts or EPS bearer that were previously activated with IPv4v6 and reactivate the PDP contexts or EPS bearers separately, for IPv4 and/or IPv6, without attempting to determine if data has been received. This may lead to a saving in network resources, UE processing resources, and/or UE battery power.

If the first UE 120 was configured for IPv6 addressing by the first access point 110 and the IP version field in the mobility message sent by the second access point 126 indicates that the second access point 126 is configured to support IPv4 addressing, the first UE 120 may deactivate the PDP context or the EPS bearer, without attempting to assess that no data has been received. This may lead to a saving in network resources, UE processing resources, and UE battery power conservation. If the first UE 120 was configured for IPv4 addressing by the first access point 110 and the IP version field in the mobility message sent by the second access point 126 indicates that the second access point 126 is configured to support IPv6 addressing, the first UE 120 may deactivate the PDP context or the EPS bearer, without attempting to assess that no data has been received. This may lead to a saving in network resources, UE processing resources, and UE battery power conservation.

The solution described above may also be useful when the first UE 120 powers on. For example, if the first UE 120 reads from the System Information messages transmitted by the access point 110, 126 that the access network on which the first UE 120 is camped does not support a particular IP Version type and/or IP addressing type, the first UE 120 may not attempt to activate the PDP contexts for which the applications executing on the first UE 120 prefer or require the particular unsupported IP addressing type. For example, if the IP Version field of the System Information messages indicate the access node 110, 126 supports IPv4, the first UE 120 will not activate the PDP contexts or EPS bearers associated with applications that need IPv6 type addressing. In another example, if the IP version field of the system information messages indicates the access node 110, 126 supports hybrid IPv4v6 single, then the first UE 120 will not attempt to activate PDP contexts or EPS bearers with IPv4v6, but instead will activate the PDP contexts or EPS bearers for IPv4 and/or IPv6 separately (for example using independent PDP contexts or EPS bearers).

The mobility messages that may contain the IP version field comprise a MobilityFromEUTRACommand message, a Physical Channel Reconfiguration message, an inter-RAT cell change order message, a PS Handover command message, a Cell Change Order message, a Routing Area Update Accept message, a Tracking Area Update Accept message, and an Attach Accept message. One or more of these messages may be extended to add new code-points or values in an already existing information element or in a new information element containing the IP version field. The MobilityFromEUTRACommand message may be used in the context of a mobility from E-UTRA procedure to move the first UE 120 in a RRC_CONNECTED state in LTE to a cell using another radio access technology, for example GERAN, UTRAN, CDMA-200, or other systems, for example to complete a handover of the first UE 120 or to complete a cell change order. The Physical Channel Reconfiguration message may be used in the context of a physical channel reconfiguration procedure within UTRAN to establish, reconfigure, and release physical channels. The inter-RAT cell change order message may be used in the context of an inter-RAT cell change order procedure to transfer, under the control of the network 106, a connection between the first UE 120 and UTRAN to another radio access technology.

The PS Handover command message may be used to support a PS handover within GERAN of from GERAN to UTRAN or to LTE. The Cell Change Order message may be sent in GERAN on the PCCCH or the PACCH by the network 106 to the first UE 120 to command the first UE 120 to leave the current cell and change to a new cell. The Routing Area Update Accept message may be used in GERAN or UTRAN. The Tracking Area Update Accept message may be used in LTE. The Attach Accept message may be used in any of GERAN, UTRAN, and LTE.

In an embodiment, the IP version field may comprise an enumerated value. For example, in an embodiment, the IP version field may comprise two bits having values 00 corresponding to IPv4 addressing, 01 corresponding to IPv6 addressing, 10 corresponding to hybrid IPv4v6 double addressing, and 11 corresponding to IPv4v6 single addressing. The hybrid IPv4v6 addressing code-point means "IPv4v6 dual address PDP type" and means that both an IPv4 address and an IPv6 address can be allocated on the same PDP context. For example, the code-point 10 may be assigned for this purpose. In another embodiment a different correspondence between bit values and IP addressing types may be employed. Alternatively, in another embodiment, the IP version field may encode the IP addressing type for each of a plurality of access point names (APNs) associated with the first UE 120.

In another embodiment, a new code-point could have the meaning "IPv4 and IPv6 are supported in different PDP contexts (for the same APN)," "IPv4v6 single address PDP type." This would trigger the first UE 120 to request activation of a different PDP context for IPv4 and IPv6 addresses. This would be achieved by the first UE requesting single address bearer in the PDP context activation request message. For example, the code-point 11 may be assigned for this purpose.

In another embodiment, the first UE 120 may infer the IP addressing type employed by the access node 110, 126 and/or the SGSN based on other version information provided in the broadcast system information and/or the mobility messages. In an embodiment, a SGSN version field may be provided in one or more of the mobility messages and/or the system information message. The SGSN version field may comprise three bits and employ the following coding: 000 indicates the SGSN is 3GPP Release 8 with Gn/Gp interface, 001 indicates the SGNS is 3GPP Release 8 with a S4 interface, 010 indicates that the SGNS is 3GPP Release 9, and the remaining bit codes are unallocated and/or reserved for future coding of SGSN versions. The first UE 120 may infer that the access node 110, 126 and/or the SGSN supports hybrid IPv4v6 addressing type when the SGSN version field is coded with one of the value 001 and the value 010. In other embodiments, however, other inferences may be associated with the SGSN version fields.

In another embodiment, a SGSN version field and a core network interface (CNI) type field may be provided in one or more of the mobility messages and/or the system information message. The SGSN version field may comprise three bits and employ the following coding: 000 indicates the SGSN is Release '98 or older, 001 indicates the SGSN is Release '99 to Release 8, 010 indicates the SGSN is Release 9 or later, and the remaining bit codes are unallocated and/or reserved for future coding of SGSN versions. The CNI type field may comprise one bit and may employ the following coding: 0 indicates the interface is Gn/Gp, 1 indicates the interface is S3/S4. The first UE 120 may infer that an SGSN at Release 9 or later supports hybrid IPv4v6 addressing. The first UE 120 may infer that an SGSN version field coding to release '99 to Release 8 in combination with a CNI type field coding to S3/S4 also indicates support for hybrid IPv4v6 addressing. The first UE 120 may infer that an SGSN version field coding to Release '99 to Release 8 in combination with a CNI type field coding to Gn/Gp indicates the lack of support for hybrid IPv4v6 addressing. In other embodiments, however, other inferences may be associated with the SGSN version field and/or the CNI type field.

UE Triggered PDP Context Re-Establishment:

In an embodiment, when the UE changes Routing Area (RA) within 2G/3G or changes RAT from LTE to 2G/3G, when it assesses that the data transfer is interrupted for some PDP Contexts while the radio connection is maintained, it could deactivate and re-establish the related PDP Context(s). This could be achieved by application-aware reactivation of PDP contexts. For example, a timer may be used on the UE side to assess this. This timer may be on a per application basis, and started when there is no user data activity. At expiry of the timer, the PDP Context for the given application would be re-activated.

Another, possibly complementary, embodiment would be that, to avoid to erroneously deactivate and re-establish a PDP Context for which there is no data to be transferred because the application does not require data transfer at this time, the UE may in addition use a trigger from the application to ensure that the delay in the data transfer is abnormal ('data expected' trigger or status). Thus, the functionality based on timer from the above embodiment may be activated only with the condition of 'data expected' for the relevant PDP Context. This means that this embodiment would act as an 'inhibit' function for the previous embodiment. If no data is expected for a given application (because of no user action for certain applications for examples, or end of data reached for certain applications for example), then the re-activation of PDP Context based on no user data timer would not be enabled.

This functionality would involve deactivation and reactivation of PDP context(s) triggered by the UE, so appears detectable (by detecting the corresponding messages triggered by the UE and sent to the SGSN). This embodiment might not impact or add any signaling in the standards. However, it may be that the standards are still updated to stress this possibility for the UE.

Providing the Information from Network to UE in "Mobility Messages"

Another embodiment (or set of embodiments) may be to indicate to the UE the configuration choice of the target Core Network, in terms of IP support. In order to achieve this, the content of the messages that are sent to the UE by the Network at change of RAT from LTE to 2G/3G, or at change of RA within 2G/3G, could be enhanced to add the target SGSN configuration. This would indicate to the UE if the target SGSN supports IPv4 only, IPv6 only, or IPv4v6.

If the UE assesses that the new target configuration is IPv4 or IPv6 while the initial configuration was IPv4v6, the UE can resume immediately the data transfer by using the new appropriate addressing. If the UE assesses that the target configuration is IPv4 while the initial configuration was IPv6, then it can immediately reactivate the PDP context. If the UE assesses that the target configuration is IPv6 while the initial configuration was IPv4, then it can immediately reactivate the PDP context. The messages that could provide this type of information to the UE are listed below.

MobilityFromEUTRACommand Message

The mobility from E-UTRA procedure may be used to move a UE in RRC_CONNECTED state in LTE to a cell using another Radio Access Technology (RAT), e.g. GERAN, UTRA or CDMA2000 systems. The mobility from E-UTRA procedure covers both handover, i.e. the MobilityFromEUTRACommand message includes radio resources that have been allocated for the UE in the target cell; and cell change order. Thus, the MobilityFromEUTRACommand message may include information facilitating access of and/or connection establishment in the target cell, e.g. system information. Cell change order may be applicable only to GERAN.

Possible encoding of the new IP Version field can be as follows:

```
-- ASN1START
MobilityFromEUTRACommand ::=        SEQUENCE {
    rrc-TransactionIdentifier       RRC-TransactionIdentifier,
    criticalExtensions              CHOICE {
        c1                                  CHOICE{
            mobilityFromEUTRACommand-r8         MobilityFromEUTRACommand-r8-IEs,
            spare3 NULL, spare2 NULL, spare1    NULL
        },
        criticalExtensionsFuture        SEQUENCE { }
    }
}
MobilityFromEUTRACommand-r8-IEs ::= SEQUENCE {
    cs-FallbackIndicator            BOOLEAN,
    purpose                         CHOICE{
        handover                        Handover,
        cellChangeOrder                 CellChangeOrder
    },
    nonCriticalExtension            SEQUENCE {                      OPTIONAL -- Need
OP
        targetCN-IP version             ENUMERATED {ipv4, ipv6, ipv4v6, spare},
    }
}
Handover ::=                        SEQUENCE {
    targetRAT-Type                      ENUMERATED {
                                            utra, geran, cdma2000-1XRTT, cdma2000-HRPD,
                                            spare4, spare3, spare2, spare1, ...},
    targetRAT-MessageContainer          OCTET STRING,
    nas-SecurityParamFromEUTRA          OCTET STRING (SIZE (1))     OPTIONAL,    -- Cond
UTRAGERAN
    systemInformation                   SI-OrPSI-GERAN              OPTIONAL -- Cond PSHO
}
CellChangeOrder ::=                 SEQUENCE {
    t304                                ENUMERATED {
                                            ms100, ms200, ms500, ms1000,
                                            ms2000, ms4000, ms8000, spare1},
    targetRAT-Type                      CHOICE {
        geran                               SEQUENCE {
            physCellId                          PhysCellIdGERAN,
            carrierFreq                         CarrierFreqGERAN,
            networkControlOrder                 BIT STRING (SIZE (2))   OPTIONAL, -- Need
OP
            systemInformation                   SI-OrPSI-GERAN                    OPTIONAL --
Need OP
        },
        ...
    }
}
SI-OrPSI-GERAN ::=                  CHOICE {
    si                                  SystemInfoListGERAN,
    psi                                 SystemInfoListGERAN
}
```

| | |
|---|---|
| SystemInfoListGERAN ::= | SEQUENCE (SIZE (1..maxGERAN-SI)) OF OCTET STRING (SIZE (1..23)) |
| -- ASN1STOP | |

4.2.2 Physical Channel Reconfiguration Message within UTRAN

The physical channel reconfiguration procedure may be used to establish, reconfigure and release physical channels. For instance this procedure may be used to perform a hard handover and/or an HS-DSCH cell change and/or a serving E-DCH cell change. Within the tabular description of a Physical Channel Reconfiguration message, the IP Version field could be included either at the end of the table or directly below the CN Information elements fields. In the ASN.1 of the message, the IP Version field may be at the end of the message for backwards compatibility reasons.

Another embodiment may be to add the IP Version field in the "NAS system information (GSM-MAP)", as it would hence be included in the CN Information info IE in a backward compatible way. The "NAS system information (GSM-MAP)" may be coded in TS 24.008 (under the name "Core Network System information with use of a Length field), and in turn included in the CN Information info IE. In turn, one component of the "Core Network System Information" may be the "PS domain specific system information", that could be enhanced to add the IP version bits. It should be noted that the CN information info IE may be also included in the following messages (all downlink messages): ACTIVE SET UPDATE, CELL UPDATE CONFIRM, RADIO BEARER RECONFIGURATION, RADIO BEARER RELEASE, RADIO BEARER SETUP, TRANSPORT CHANNEL RECONFIGURATION, URA UPDATE CONFIRM, UTRAN MOBILITY INFORMATION. Thus, updating the PS domain specific system information element and hence the CN information info IE may provide the IP Version information in those messages as well.

In addition, the "NAS system information (GSM-MAP)" may be also included in the following UTRAN messages or information elements: Message System Information Block type 1 (SIB1), Information Element CN Domain System Information, included in the message System Information Block type 13 (SIB13) and System Information Block type 1 (SIB1), Information Element CN information info full, included in the message UTRAN mobility information, and Message SRNS Relocation info. Therefore, enhancing the "NAS system information (GSM-MAP)" in TS 24.008 by adding the IP Version information would also allow for this to be available in the messages listed above.

(Inter-RAT) Cell Change Order from UTRAN Message

The purpose of the inter-RAT cell change order procedure is to transfer, under the control of the network, a connection between the UE and UTRAN to another radio access technology (e.g. GSM). This procedure may be used in CELL_DCH and CELL_FACH state. This procedure may be used when no RABs are established or when the established RABs are only from PS domain. This procedure may not be used when there is no PS signaling connection.

In another embodiment, a new IE can be inserted into the 'CELL CHANGE ORDER FROM UTRAN'. Where the new IP version field is defined as follows:

| IP Version (2 bit field) | |
|---|---|
| bit | |
| 2 1 | value |
| 0 0 | IPv4 |
| 0 1 | IPv6 |
| 1 0 | IPv4v6 |
| 1 1 | Unused |

"PS Handover Command" Message within GERAN or from GERAN to UTRAN/LTE

In GERAN packet transfer mode, a mobile station that supports PS handover may receive a PS HANDOVER COMMAND message from the BSS indicating the resources to be used in the new cell. An example of <PS Handover Command message content>:: may be:

```
                < PAGE_MODE : bit (2) >
                { 0 < Global TFI : < Global TEI IE > >
                    <CONTAINER_ID : bit(2) >
                    { 00    < PS Handover to A/Gb Mode Payload :
                            { 00 < PS Handover RR Info: < PS Handover Radio Resources IE > >
                            | 01 < PS Handover RR 2 Info: < PS Handover Radio Resources 2 IE > >
                        ! < RR Handover RR Info Error: {10 | 11 } bit (*) = <no string> > } - Extended for
future changes
                            { 0 | 1 < NAS Container for PS Handover IE > }
                    | 01    < PS Handover to UTRAN Payload :
                            <RRC Container IE > > }
                    | 10    < PS Handover to E-UTRAN Payload :
                            < RRC Container IE > >
                    ! < Message escape: 11 bit (*) = < no string > > }           -- Extended for future
changes
                    { null | 0bit ** = < no string >    -- Receiver compatible with earlier release
                        | 1                 -- Additions in Rel-8:
                            { 0 | 1 < E-UTRAN_CCN_ACTIVE : bit (1) > }
                            { 0 | 1 { 1 < Measurement_Control_E-UTRAN : bit(1) >
                                            < E-UTRAN_FREQUENCY_INDEX : bit (3) >
                                            { 1 < E-UTRAN_FREQUENCY_INDEX : bit (3) >
                    }** 0
                                }** 0
                            }
```

```
                    { 0 | 1 {1 < Measurement_Control_UTRAN : bit(1) >
                                < UTRAN_FREQUENCY_INDEX : bit (5) >
                                {1 < UTRAN_FREQUENCY_INDEX : bit (5) > }
** 0
                              }** 0
                       }
                       {null | 0 bit** = < no string > -- Receiver backward compatible with earlier
version
                          | 1
     -- Additions for Rel-9
                                 < Enhanced Flexible Timeslot Assignment : bit >
                       }
        }
     <IP Version> : bit (2)>
        < padding bits >
             ! < Non-distribution part error : bit (*) = < no string > >
     ! < Address information part error : bit (*) = < no string > > }
! < Non-distribution part error : bit (*) = < no string > > ;
```

Cell Change Order Message within GERAN or from GERAN to UTRAN/LTE

This message may be sent in GERAN on the PCCCH or PACCH by the network to the mobile station to command the mobile station to leave the current cell and change to a new cell. For a 3G multi-RAT mobile station the new cell may be a 3G Cell. For an E-UTRAN multi-RAT mobile station the new cell may be an E-UTRAN cell.

Providing the Information from Network to UE in System Information Messages in GERAN/UTRAN System Information messages that are broadcast by GERAN/UTRAN Cells could be enhanced to add information related to the configuration of the target core network in terms of IP Version.

UTRAN System Information

The following may be an example for UTRAN SIB 1 message.

| Information Element/Group name | Need | Multi | Type and reference | Semantics description |
|---|---|---|---|---|
| CN information elements | | | | |
| CN common GSM-MAP NAS system information | MP | | NAS system information (GSM-MAP) 10.3.1.9 | |
| CN domain system information list | MP | 1 to <maxCNdomains> | | Send CN information for each CN domain. |
| >CN domain system information | MP | | CN domain system information 10.3.1.2 | |
| >IP Version | | | | |
| UE information | | | | |
| UE Timers and constants in idle mode | MD | | UE Timers and constants in idle mode 10.3.3.44 | The UE behaviour is unspecified if this IE is absent. |
| UE Timers and constants in connected mode | MD | | UE Timers and constants in connected mode 10.3.3.43 | Default value means that for all timers and constants For parameters with need MD, the defaults specified in 10.3.3.43 apply and For parameters with need OP, the parameters are absent |

The encoding of the IP version field itself (2 bits field) may be the same as defined above. In the ASN.1 definitions, the new field may appear at the end of the message for backwards compatibility reasons. It should be noted that the tabular description above does not necessarily reflect the field order in the message coding.

Alternatively, it should be noted that the information element "NAS system information" in the SIB1 above refers to the Core Network system information in 3GPP TS 24.008. One component of it is the PS domain specific system information, that could be enhanced to add the IP version bits. So, by enhancing the Core Network System information in 3GPP TS 24.008 (or more specifically the PS domain specific system information), this may provide the IP Version information in the SIB1 message (together as in other messages).

Possible Enhancement: Providing IP Version Information on APN Level

Figure 2:
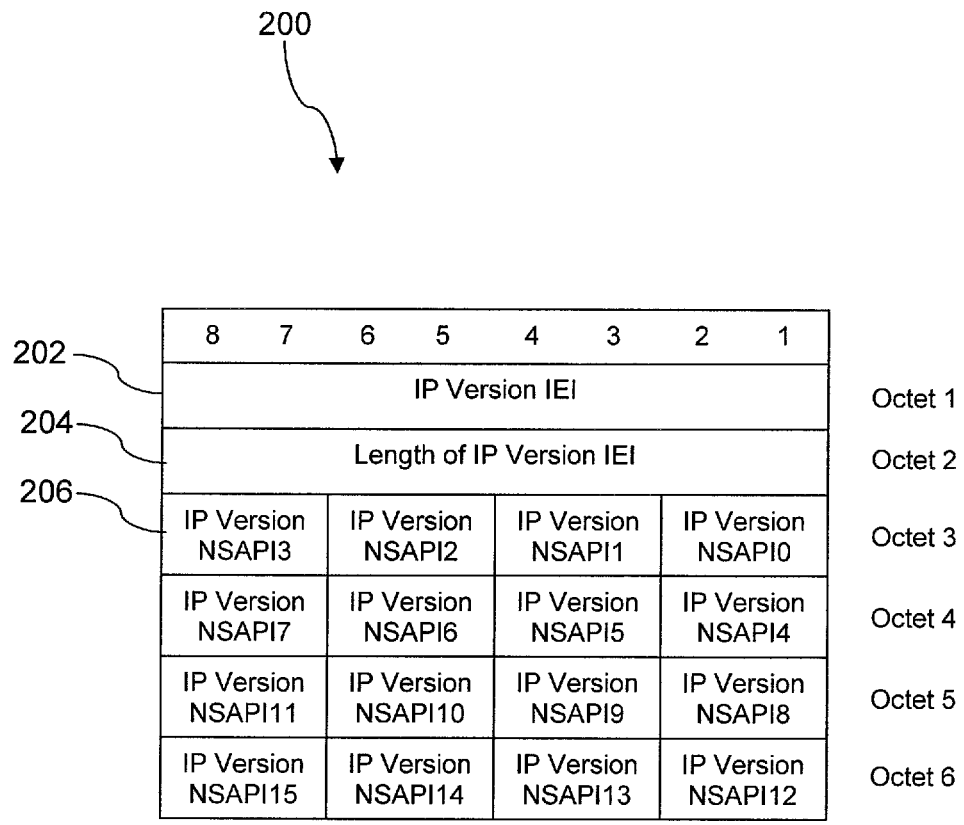
FIG. 2 is an illustration of an information element according to an embodiment of the disclosure.

An enhancement to the embodiments above where information is provided from Network from UE could be that, in the information added to those messages, instead of claiming support at SGSN level, it might be desired to provide the supported IP version for each APN (because each PDN could be on a different version). So, the coding could be modified in the messages from above so that the IP Version information is provided per APN. However, the coding of APN strings may be quite long. Hence, the NSAPI could be used to identify the relevant PDP Context, by this avoiding the need to code the APN themselves. For example, here is a possible re-coding for the IP Version IE, re-using the NSAPI number (as shown in FIG. 2).

| IP Version (2 bit field) | |
|---|---|
| bit | |
| 2 (/even) 1 (/odd) | value |
| 0 0 | IPv4 |
| 0 1 | IPv6 |
| 1 0 | IPv4v6 |
| 1 1 | Unused |

This new IE (that would include a length field to be backwards compatible) could be shortened so that the IP version is sent only for the active PDP contexts (aligned at the octet boundary, of course). This IE can be inserted in e.g. the Routing Area Accept message or the Tracking Area Accept messages.

Another embodiment would be to enhance the (already existing) PDP Context Status information element sent in e.g. the Routing Area Accept or the Tracking Area Accept messages. This IE could be of variable length such that the IP version is sent only for the active PDP contexts (aligned at the octet boundary, of course). This IE can be inserted in the Routing Area Accept or the Tracking Area Accept messages.

It should be noted that it is also possible to include the PDP Context Status information element also in the Routing Area Update Request, Service Request and Service Accept (UMTS only) messages. So, the extension on IP version information (octets 5 to 8) would not be added for those messages, or it could be specified that it shall be ignored by the receiver.

Possible Enhancement: Re-Using IP Version Information for UE Cell Reselection

As an enhancement, the UE when reselecting could favor a cell that does support the IPv6 configuration (if the application supports only IPv6 for example). Alternatively, it could favor a cell that does support IPv4v6 configuration. For example, the UE could select another cell than the best one if it is good enough and/or not too worse (of a given threshold) than the best cell, in terms of channel quality (RSCP, RSSI, Ec/N0, Rxqual, Rxlev). The cell reselection criteria to enable this could be either standardized or left to the UE implementation. In the first case, the value of the threshold could be indicated from Network to UE.

Normal and Periodic Routing Area Updating Procedure Accepted by the Network

As used herein the term "shall" may also include "may" in some embodiments. Thus, the term "shall" does not necessarily state a requirement, but could in some embodiments. Likewise, the term "is" or "are" may also include "may" in some embodiments.

If the routing area updating request has been accepted by the network, a ROUTING AREA UPDATE ACCEPT message shall be sent to the MS. The network may assign a new P-TMSI and/or a new P-TMSI signature for the MS. If a new P-TMSI and/or P-TMSI signature have been assigned to the MS, it/they shall be included in the ROUTING AREA UPDATE ACCEPT message together with the routing area identification. In a shared network the network shall indicate the PLMN identity of the CN operator that has accepted the routing area updating request in the RAI contained in the ROUTING AREA UPDATE ACCEPT message (see 3GPP TS 23.251 [109]).

If a new DRX parameter was included in the ROUTING AREA UPDATE REQUEST message, the network shall store the new DRX parameter and use it for the downlink transfer of signaling and user data.

If the MS has indicated in the ROUTING AREA UPDATE REQUEST message that it supports PS inter-RAT handover to UTRAN Iu mode, the network may include in the ROUTING AREA UPDATE ACCEPT message a request to provide the Inter RAT information container.

If the MS has included the MS network capability IE or the UE network capability IE or both in the ROUTING AREA UPDATE REQUEST message, the network shall store all octets received from the MS, up to the maximum length defined for the respective information element. In case the UE network capability IE indicated new information to the network, the MS shall set the TIN to "P-TMSI".

NOTE: This information is forwarded to the new SGSN during inter-SGSN handover or to the new MME during intersystem handover to S1 mode.

If the DRX parameter was included in the DRX parameter IE in the ROUTING AREA UPDATE REQUEST message, the network shall replace any stored DRX parameter with the received parameter and use it for the downlink transfer of signaling and user data.

In A/Gb mode the Cell Notification information element shall be included in the ROUTING AREA UPDATE ACCEPT message in order to indicate the ability of the network to support the Cell Notification.

The network shall change to state GMM-COMMON-PROCEDURE-INITIATED and shall start the supervision timer T3350 as described in subclause 4.7.6.

If the LAI or PLMN identity contained in the ROUTING AREA UPDATE ACCEPT message is a member of any of the "forbidden" lists then any such entry shall be deleted.

In Iu mode, the network should prolong the PS signaling connection if the mobile station has indicated a follow-on request pending in ROUTING AREA UPDATE REQUEST. The network may also prolong the PS signaling connection without any indication from the mobile terminal.

If the PDP context status information element is included in ROUTING AREA UPDATE REQUEST message, then the network shall deactivate all those PDP contexts locally (without peer to peer signaling between the MS and the network), which are not in SM state PDP-INACTIVE on network side but are indicated by the MS as being in state PDP-INACTIVE.

If the MBMS context status information element is included in the ROUTING AREA UPDATE REQUEST message, then the network shall deactivate all those MBMS contexts locally (without peer to peer signaling between the MS and network) which are not in SM state PDP-INACTIVE on the network side, but are indicated by the MS as being in state PDP-INACTIVE. If no MBMS context status information element is included, then the network shall deactivate all MBMS contexts locally which are not in SM state PDP-INACTIVE on the network side.

Upon receipt of a ROUTING AREA UPDATE ACCEPT message, the MS stores the received routing area identification, stops timer T3330, shall reset the routing area updating attempt counter and sets the GPRS update status to GU1 UPDATED. If the message contains a P-TMSI, the MS shall use this P-TMSI as new temporary identity for GPRS services and shall store the new P-TMSI. If no P-TMSI was included by the network in the ROUTING AREA UPDATING ACCEPT message, the old P-TMSI shall be kept. Furthermore, the MS shall store the P-TMSI signature if received in the ROUTING AREA UPDATING ACCEPT message. If no P-TMSI signature was included in the message, the old P-TMSI signature, if available, shall be deleted.

If the ROUTING AREA UPDATE REQUEST message was used to update the network with a new DRX parameter IE, the MS shall start using the new DRX parameter upon receipt of the ROUTING AREA UPDATE ACCEPT message and shall set the TIN to "P-TMSI".

If the PDP context status information element is included in ROUTING AREA UPDATE ACCEPT message, then the MS shall deactivate all those PDP contexts locally (without peer to peer signaling between the MS and network), which are not in SM state PDP-INACTIVE in the MS but are indicated by the network as being in state PDP-INACTIVE.

If the MBMS context status information element is included in the ROUTING AREA UPDATE ACCEPT message, then the MS shall deactivate all those MBMS contexts locally (without peer to peer signaling between the MS and network) which are not in SM state PDP-INACTIVE in the MS, but are indicated by the network as being in state PDP-INACTIVE. If no MBMS context status information element is included, then the MS shall deactivate all those MBMS contexts locally which are not in SM state PDP-INACTIVE in the MS.

In A/Gb mode, if the ROUTING AREA UPDATE ACCEPT message contains the Cell Notification information element, then the MS shall start to use the LLC NULL frame to perform cell updates.

If a MS supporting CSG for manual update of the Allowed CSG list receives a ROUTING AREA UPDATE ACCEPT message, the MS shall check if the CSG ID of the cell where the MS has sent the ROUTING AREA UPDATE REQUEST message is contained in the Allowed CSG list. If not, the MS shall add that CSG ID to the Allowed CSG list.

The network may also send a list of "equivalent PLMNs" in the ROUTING AREA UPDATE ACCEPT message. Each entry of the list contains a PLMN code (MCC+MNC). The mobile station shall store the list, as provided by the network, except that any PLMN code that is already in the "forbidden PLMN" list shall be removed from the "equivalent PLMNs" list before it is stored by the mobile station. In addition the mobile station shall add to the stored list the PLMN code of the registered PLMN that sent the list. All PLMNs in the stored list shall be regarded as equivalent to each other for PLMN selection, cell selection/re-selection and handover. The stored list in the mobile station shall be replaced on each occurrence of the ROUTING AREA UPDATE ACCEPT message. If no list is contained in the message, then the stored list in the mobile station shall be deleted. The list shall be stored in the mobile station while switched off so that it can be used for PLMN selection after switch on.

If the PDP Type IE in the ROUTING AREA UPDATE ACCEPT message indicates "single IPv4v6", the MS shall deactivate the PDP contexts that were previously activated with "IPv4v6" and re-activate them independently (with V4 PDP type, and V6 PDP type, in different PDP Contexts).

If the PDP Type IE in the ROUTING AREA UPDATE ACCEPT message indicates "IPv4", or "IPv6", the MS should not request a PDP context for the other PDP Type.

A ROUTING AREA UPDATE COMPLETE message shall be returned to the network if the ROUTING AREA UPDATE ACCEPT message contained any of: a P-TMSI; Receive N-PDU Numbers (see 3GPP TS 44.065 [78] and 3GPP TS 25.322 [19b]); or a request for the provision of Inter RAT handover information or E-UTRAN inter RAT handover information or both.

If Receive N-PDU Numbers were included, the Receive N-PDU Numbers values valid in the MS, shall be included in the ROUTING AREA UPDATE COMPLETE message.

If the network has requested the provision of Inter RAT handover information or E-UTRAN inter RAT handover information or both, the MS shall return a ROUTING AREA UPDATE COMPLETE message including the Inter RAT handover information IE or E-UTRAN inter RAT handover information IE or both to the network.

NOTE 1: In Iu mode, after a routing area updating procedure, the mobile station can initiate Service Request procedure to request the resource reservation for the active PDP contexts if the resources have been released by the network or send upper layer message (e.g. ACTIVATE PDP CONTEXT REQUEST) to the network via the existing PS signaling connection.

In Iu mode, if the network wishes to prolong the PS signaling connection (for example, if the mobile station has indicated "follow-on request pending" in ROUTING AREA UPDATE REQUEST message) the network shall indicate the "follow-on proceed" in the ROUTING AREA UPDATE ACCEPT message. If the network wishes to release the PS signaling connection, the network shall indicate "no follow-on proceed" in the ROUTING AREA UPDATE ACCEPT message.

After that in Iu mode, the mobile station shall act according to the follow-on proceed flag included in the Update result information element in the ROUTING AREA UPDATE ACCEPT message (see subclause 4.7.13).

The network may also send a list of local emergency numbers in the ROUTING AREA UPDATE ACCEPT, by including the Emergency Number List IE. The mobile equipment shall store the list, as provided by the network, except that any emergency number that is already stored in the SIM/USIM shall be removed from the list before it is stored by the mobile equipment. If there are no emergency numbers stored on the SIM/USIM, then before storing the received list the mobile equipment shall remove from it any emergency number stored permanently in the ME for use in this case (see 3GPP TS 22.101 [8]). The list stored in the mobile equipment shall be replaced on each receipt of a new Emergency Number List IE.

The emergency number(s) received in the Emergency Number List IE are valid only in networks with the same MCC as in the cell on which this IE is received. If no list is contained in the ROUTING AREA UPDATE ACCEPT message, then the stored list in the mobile equipment shall be kept, except if the mobile equipment has successfully registered to a PLMN with an MCC different from that of the last registered PLMN.

The mobile equipment shall use the stored list of emergency numbers received from the network in addition to the emergency numbers stored on the SIM/USIM or ME to detect that the number dialed is an emergency number.

NOTE 2: The mobile equipment may use the emergency numbers list to assist the end user in determining whether the dialed number is intended for an emergency service or for another destination, e.g. a local directory service. The possible interactions with the end user are implementation specific.

The list of emergency numbers shall be deleted at switch off and removal of the SIM/USIM. The mobile equipment shall be able to store up to ten local emergency numbers received from the network.

In order to indicate to the MS that the GUTI and TAI list assigned to the MS remain registered with the network and are valid in the MS, the network shall indicate in the Update result IE in the ROUTING AREA UPDATE ACCEPT message that ISR is activated.

If the ROUTING AREA UPDATE ACCEPT message contains: i) no indication that ISR is activated, an MS supporting S1 mode shall set the TIN to "P-TMSI"; or ii) an indication that ISR is activated, the MS shall regard the available GUTI and TAI list as valid and registered with the network. If the TIN currently indicates "GUTI", the MS shall set the TIN to "RAT-related TMSI".

Turning now to FIG. 2, an information element 200 is described. The IP Version Information Element Identity 202 may comprise a first 8 bits (octet 1). The Length of IP Version Information Element field 204 may comprise a second 8 bits (octet 2). The coding of the IP Versions associated with each of the APNs 206 may each be encoded with 8 bits (octet 3 through octet 6). The NSAPI number referenced in this Information Element field points to particular PDP context and hence to a particular APN. In an embodiment, a restriction of the information element 200 to 11 PDP contexts may apply, to conform to existing 3GPP maximum number of PDP contexts. In an embodiment, only those APNs that are associated with an activated PDP context may be encoded, and the information element 200 may be shortened when fewer APNs are in use.

Turning again to FIG. 1, in an embodiment, when the first access point 110 is a GERAN access point, the first access point 110 may broadcast system information messages that comprise information indicating the IP addressing type supported by the first access point 110. Similarly, when the first access point 110 is a UTRAN access point, the first access point 110 may broadcast system information messages that comprise information indicating the IP addressing type supported by the first access point 110. For example, an IP version field could appear at the end of the system information block type 1 (SIB1). Alternatively, The PS domain specific system information in the NAS system information portion of the SIB1 could be enhanced to add the IP version field. The IP version fields in the broadcast system information messages, in either the GERAN, the UTRAN case, or the LTE case, as described further above with reference to FIG. 2, may encode the IP addressing type for this access point. In an embodiment, the first UE 120 may know and/or identify neighboring access points 110, 126 and/or other neighboring access points by reading the system information broadcast by each of the access points 110, 126.

In an embodiment, in the circumstance that the first UE 120 identifies a plurality of suitable serving access points, the first UE 120 may reselect to the access point that supports the IP addressing type that is preferred by the first UE 120 (e.g., needed for one or more of the applications executed by the first UE 120). For example, when the first UE 120 is configured for IPv6 addressing, the first UE 120 may select to the access point that likewise supports IPv6 addressing versus another access point that supports only IPv4 addressing. Alternatively, when the first UE 120 is configured for IPv4 addressing, the first UE 120 may select to the access point that likewise supports IPv4 addressing versus another access point that supports only IPv6 addressing. Alternatively, when the first UE 120 is configured for IPv4v6 addressing, the first UE 120 may select to the access point that likewise supports IPv4v6 addressing versus another access point the supports only IPv6 addressing or only IPv4 addressing. In an embodiment, the first UE 120 may select another access point than the best access point (for example, the access point providing best coverage, the least overloaded access point, and/or the best access point according to other criteria) if the access point is not worse than the best access point of a given value, for example the difference between the channel qualities of the best and candidate cells does not exceed a certain value (for example RSCP, RSSI, Ec/NO, Rxqual, Rxlev, or any combination thereof). In an embodiment, the first UE 120 may select another access point than the best access point (e.g., the access point providing best coverage, the access point least overloaded, and/or best according to another criteria) if the access point is good enough or exceeds a criteria threshold, for example exceeds a minimum channel quality (for example, RSCP, RSSI, Ec/NO, Rxqual, Rxlev, or any combination thereof).

Figure 3:
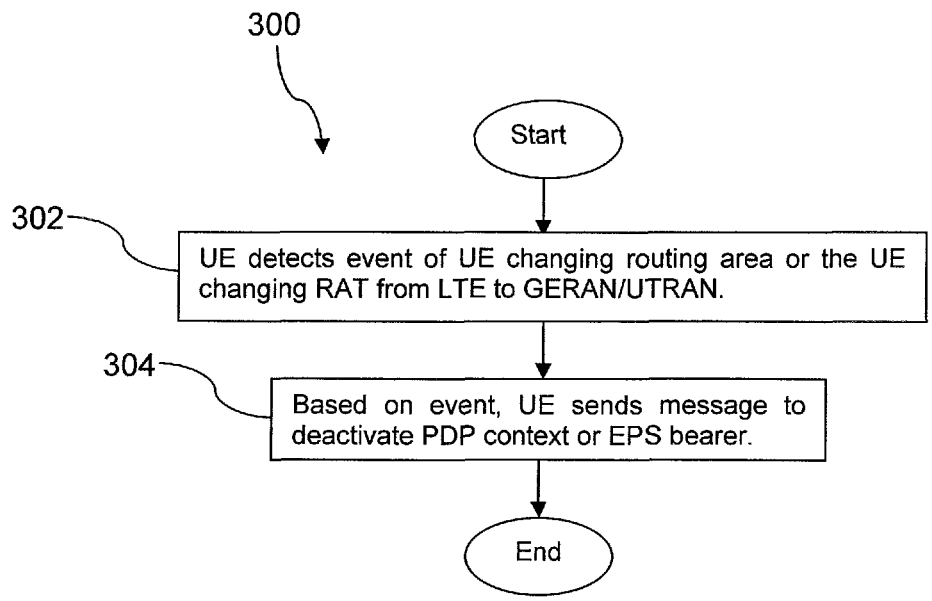
FIG. 3 illustrates a method according to an embodiment of the disclosure.

Turning now to FIG. 3, a method 300 of wireless communication is described. At block 302, the first UE 120 detects the event of one of the first UE 120 changing routing area and the first UE 120 changing radio access technology from a LTE network to a GERAN/UTRAN network. At block 304, based on the detection of block 302, the first UE 120 sends a message deactivating the PDP context or an EPS bearer.

Figure 4:
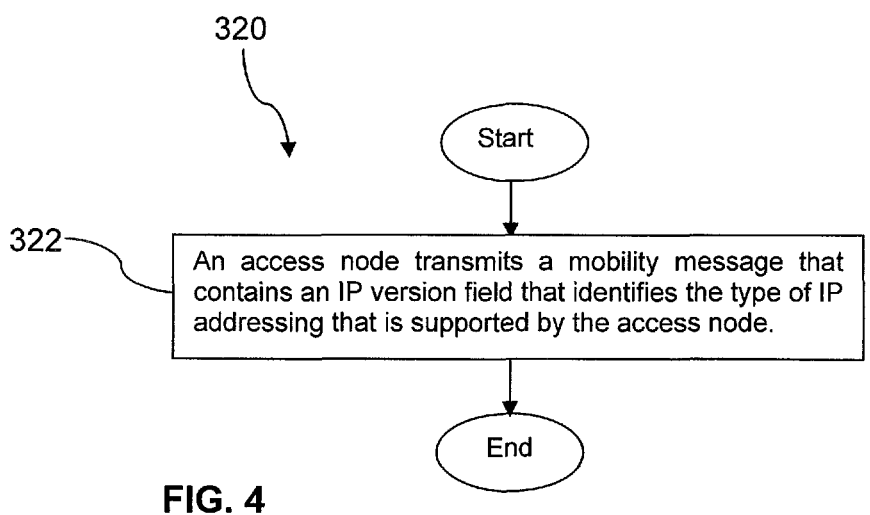
FIG. 4 illustrates a method according to an embodiment of the disclosure.

Turning now to FIG. 4, a method 320 of wireless communication is described. At block 322 the second access node 126 transmits a mobility message that contains an IP version field that identifies the type of IP addressing supported by the second access node 126.

Figure 5:
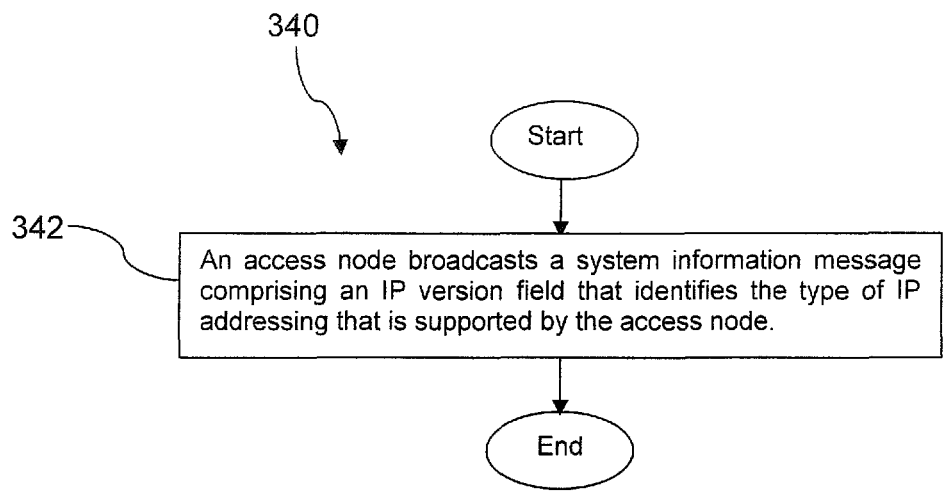
FIG. 5 illustrates a method according to an embodiment of the disclosure.

Turning now to FIG. 5, a method 340 is described. At block 342, the second access node 126 broadcasts a system information message comprising an IP version field that identifies the type of IP addressing that is supported by the access node.

Figure 6:
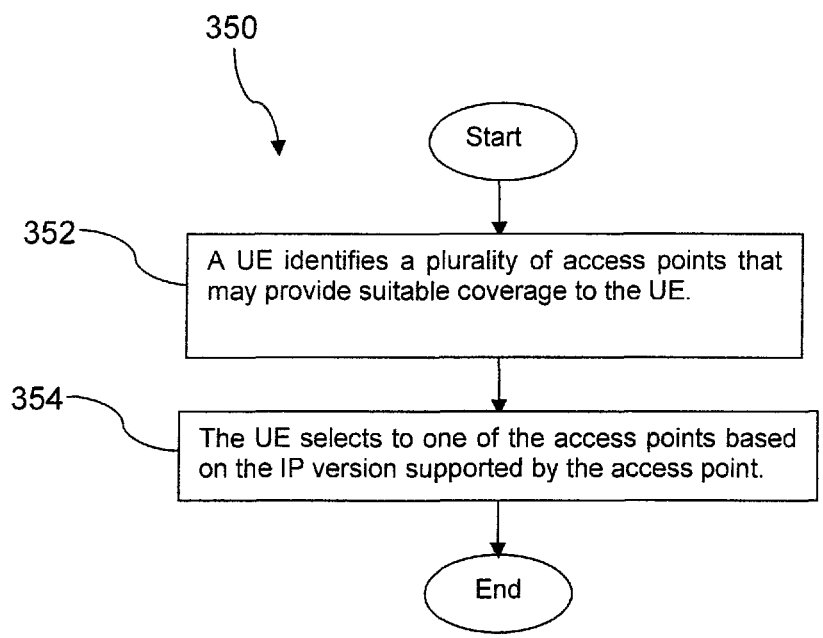
FIG. 6 illustrates a method according to an embodiment of the disclosure.

Turning now to FIG. 6, a method 350 is described. At block 352, the first UE 120 identifies a plurality of access nodes, for example access nodes 110, 126, that may provide suitable coverage for the first UE 120. In some contexts, the plurality of access nodes may be referred to as candidate access nodes. Based on the system information broadcast by the access nodes 110, 126, including an IP version field, the first UE 120 determines that the second access node 126 supports the IP addressing type that best comports with the applications on the first UE 120 and selects to the second access node 126.

Figure 7:
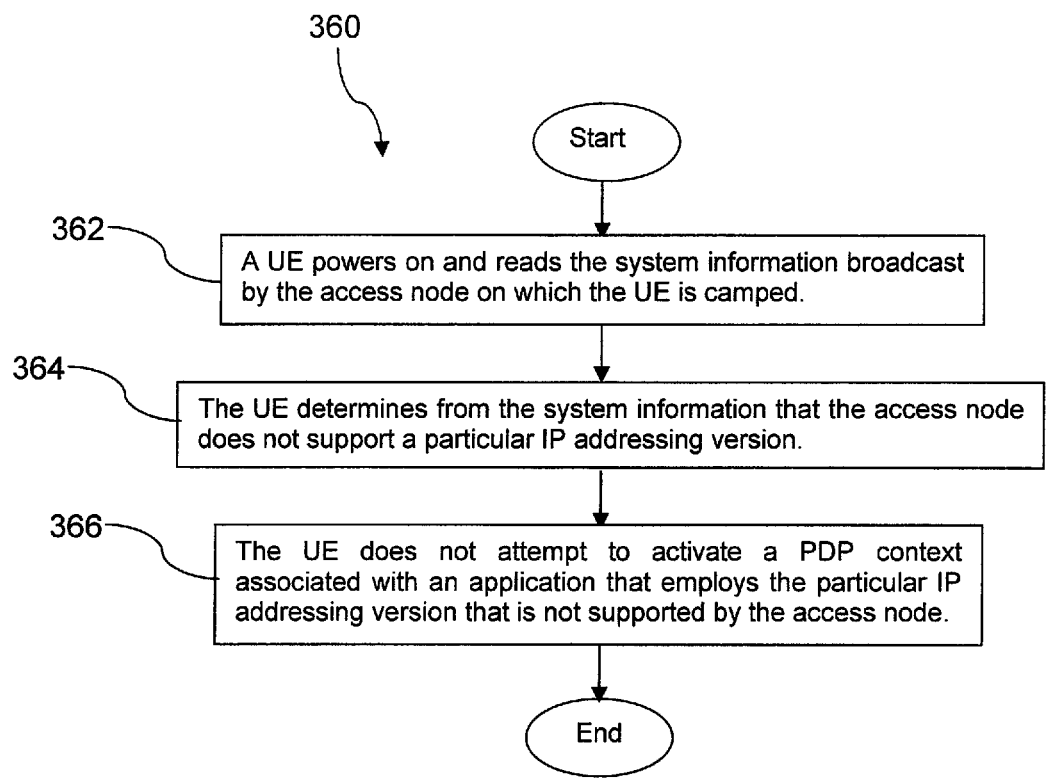
FIG. 7 illustrates a method according to an embodiment of the disclosure.

Turning now to FIG. 7, a method 360 is described. At block 362, the first UE 120 powers on and reads the system information broadcast by the first access node 110 that the first UE 120 is camped on. At block 364, the first UE 120 determines from the system information broadcast by the first access node 110, for example by reading an IP version information element of the system information, that the first access node 110 does not support a particular IP addressing version. At block 366, the first UE 120 does not attempt to activate a PDP context associated with an application of the first UE 120 that employs the particular IP addressing version that is not supported by the first access node 110.

Figure 8:
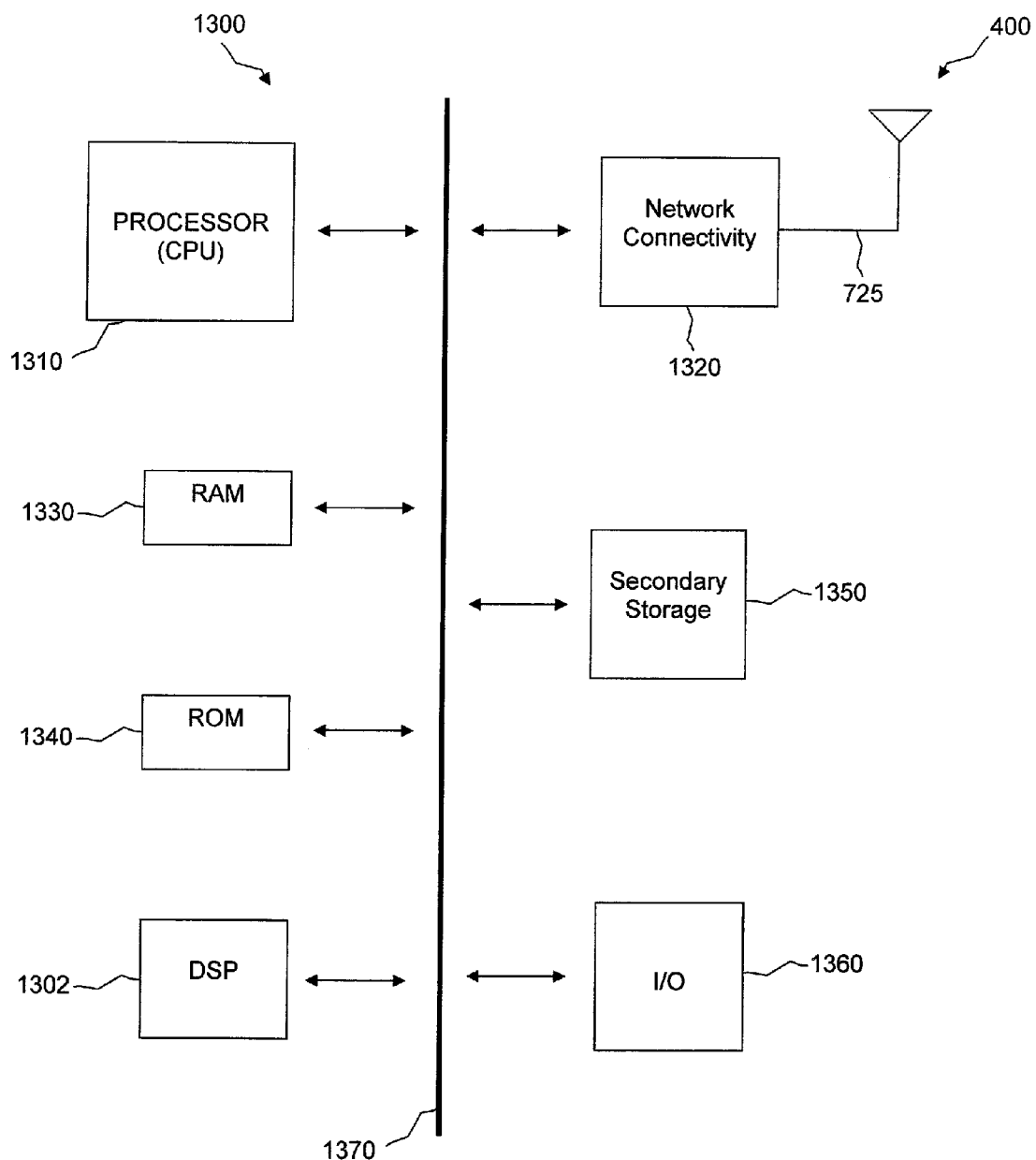
FIG. 8 illustrates a processor and related components suitable for implementing the several embodiments of the present disclosure.

The UE 120 and other components described above might include a processing component that is capable of executing instructions related to the actions described above. FIG. 8 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1302. Although the DSP 1302 is shown as a separate component, the DSP 1302 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices (e.g., UTRA, LTE, or CDMA2000), global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320.

Various combinations of the components of the system 1300, including memory, hardware, firmware, software or others may be referred to herein as a "component".

The following are incorporated herein by reference for all purposes: 3GPP TS 23.060, 3GPP TS 23.401, 3GPP TS 24.008, 3GPP TS 24.301, 3GPP TS 25.331, 3GPP TS 36.331, 3GPP TS 44.018, and 3GPP TS 44.060.

In an embodiment, a user equipment (UE) is disclosed. The UE comprises at least one component configured to detect an event of one of the UE changing routing area and the UE changing radio access technology from a long-term evolution (LTE) network to a global system for mobile communications enhanced data rates for GSM evolution radio access network (GERAN) or to a universal mobile telecommunication system terrestrial radio access network (UTRAN) and, responsive to detecting the event, to deactivate one of a first packet data protocol (PDP) context and an evolved packet system (EPS) bearer.

In an embodiment, an access node is disclosed. The access node comprises at least one component configured to transmit a mobility message to a user equipment (UE) that contains an internet protocol (IP) version field that identifies a type of internet protocol addressing supported.

In an embodiment, a user equipment (UE) is disclosed. The UE comprises a component configured to decode an internet protocol version field in a mobility message and to adapt a data communication function of the UE based on an internet protocol (IP) version field.

In an embodiment, an access node is disclosed. The access node comprises a component configured to broadcast a system information message containing an internet protocol (IP) version field identifying a type of internet protocol addressing supported by a core network associated with the access node.

In an embodiment, a method of wireless communication is disclosed. The method comprises a user equipment (UE) detecting an event of one of the UE changing routing area and the UE changing radio access technology from a long-term evolution (LTE) network to a global system for mobile communications enhanced data rates for GSM evolution radio access network (GERAN) or to a universal mobile telecommunication system terrestrial radio access network (UTRAN). The method further comprises the UE sending a message to deactivate one of a first packet data protocol (PDP) context and an evolved packet system (EPS) bearer based on detecting the event.

In an embodiment, a method of wireless communication is disclosed. The method comprises an access node transmitting a mobility message that contains an internet protocol (IP) version field that identifies a type of internet protocol addressing that is supported by the access node.

In an embodiment, a method of wireless communication is disclosed. The method comprises an access node broadcasting a system information message comprising an internet protocol version field that identifies a type of internet protocol addressing supported by the access node.

In an embodiment, a method of wirelessly communicating is disclosed. The method comprises a user equipment (UE) identifying a plurality of access points that are candidates for serving the UE and the UE selecting one of the access points based on an internet protocol addressing type supported by the selected access point.

In an embodiment, a method of wirelessly communicating is disclosed. The method comprises a user equipment (UE) powering on and reading system information broadcast by an access node on which the UE is camped, the UE determining that the access node does not support a particular internet protocol addressing type, and the UE not activating a packet data protocol (PDP) context of an evolved packet services (EPS) bearer associated with an application that employs the particular internet protocol addressing type that is not supported by the access node.

In an embodiment, a user equipment is disclosed. The user equipment comprises at least one component configured to determine an internet protocol addressing version of an access node and, responsive to determining the internet protocol addressing version of the access node, to deactivate one of a packet data protocol (PDP) context and an evolved packet system (EPS) bearer.

In an embodiment, a user equipment is disclosed. The user equipment comprises at least one component configured to detect a time-out of a data transfer of an application. Responsive to detecting the time-out of the data transfer of the application, the component is further configured to deactivate one of a packet data protocol (PDP) context based on a first internet protocol addressing version and an evolved packet system (EPS) bearer based on the first internet protocol addressing version, wherein the one of the PDP context and the EPS bearer is associated with the application. The component is further configured to reactivate the one of the PDP context and the EPS bearer based on a second internet protocol addressing version.

The embodiments also provide for a user equipment (UE) comprising a processor configured to: receive a message; and responsive to the message indicating a first Internet Protocol (IP) version type, deactivate at least one of a packet data protocol (PDP) context and an evolved packet system (EPS) bearer that are associated with a second IP version type, wherein the at least one of the PDP context and the EPS bearer had been previously activated by the UE.

The embodiments also provide for an access node comprising at least one component configured to transmit one of a mobility message or a system information message to a user equipment (UE), wherein the mobility message or the system information message contains an internet protocol (IP) version field that identifies a type of internet protocol addressing supported.

The embodiments also provide for a user equipment (UE) comprising a processor configured to decode an internet protocol (IP) version field in a mobility message and to adapt a data communication function of the UE based on the IP version field.

The embodiments also provide for a user equipment (UE) comprising at least one component configured to determine an internet protocol addressing version of an access node and, responsive to determining the internet protocol addressing version of the access node, to deactivate one of a packet data protocol (PDP) context and an evolved packet system (EPS) bearer.

The embodiments also provide for a user equipment (UE) comprising at least one component configured to detect a time-out of a data transfer of an application and, responsive to detecting the time-out of the data transfer of the application to deactivate one of a packet data protocol (PDP) context based on a first internet protocol addressing version and an evolved packet system (EPS) bearer based on the first internet protocol addressing version, wherein the one of the PDP context and the EPS bearer is associated with the application, and to reactivate the one of the PDP context and the EPS bearer based on a second internet protocol addressing version.

The embodiments also provide for a method implemented in a user equipment (UE) the method comprising receiving a message; and responsive to the message indicating a first Internet Protocol (IP) version type, deactivating at least one of a packet data protocol (PDP) context and an evolved packet system (EPS) bearer that are associated with a second IP version type, wherein the at least one of the PDP context and the EPS bearer had been previously activated by the UE.

The embodiments also provide for a method implemented in a user equipment (UE) the method comprising determining an internet protocol addressing version of an access node; and responsive to determining the internet protocol addressing version of the access node, deactivating one of a packet data protocol (PDP) context and an evolved packet system (EPS) bearer.

The embodiments also provide for a method implemented in a user equipment (UE) the method comprising detecting a time-out of a data transfer of an application; responsive to detecting the time-out of the data transfer of the application, deactivating one of a packet data protocol (PDP) context based on a first internet protocol addressing version and an evolved packet system (EPS) bearer based on the first internet protocol addressing version, wherein the one of the PDP context and the EPS bearer is associated with the application, and reactivating the one of the PDP context and the EPS bearer based on a second internet protocol addressing version.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE), comprising:
a storage device; and
a processor configured to execute instructions stored on the storage device such that when executed, cause the UE to:
set a timer in response to migration of the UE from a first access node (AN) to a second AN, wherein the timer is implemented at the UE;
detect, based on the timer, a time-out of a data transfer of an application executing on the UE;
deactivate, in response to the UE detecting the time-out of the data transfer of the application, one of a packet data protocol (PDP) context based on a first internet protocol (IP) addressing version and an evolved packet system (EPS) bearer based on the first IP addressing version, wherein the one of the PDP context and the EPS bearer is associated with the application; and
reactivate the deactivated one of the PDP context and the EPS bearer associated with the application, the deactivated one of the PDP context and the EPS bearer being reactivated with the second AN based on a second IP addressing version different from the first IP addressing version.

2. The UE of claim 1, wherein the processor is further configured to execute instructions stored on the storage device such that when executed, cause the UE to reactivate the deactivated one of the PDP context and the EPS bearer with the second AN after the UE sends a message to deactivate the one of the PDP context and the EPS bearer.

3. The UE of claim 1, wherein the processor is further configured to execute instructions stored on the storage device such that when executed, cause the UE to reactivate the deactivated one of the PDP context and the EPS bearer with the second AN in response to determining that the second AN supports the second IP addressing version.

4. The UE of claim 1, wherein the processor is further configured to execute instructions stored on the storage device such that when executed, cause the UE to determine whether the second AN supports the second IP addressing version based on a second application executing on the UE during the migration, wherein the second application is configured to employ the second IP addressing version.

5. The UE of claim 4, wherein the second AN is determined to support the second IP addressing version if a second data transfer of the second application continues after migration from the first AN to the second AN.

6. The UE of claim 1, wherein the processor is further configured to execute instructions stored on the storage device such that when executed, cause the UE to deactivate the one of the PDP context and the EPS bearer based on the second IP addressing version in response to detecting a second time-out of the data transfer of the application, and wherein the UE is further caused to reactivate the deactivated one of the PDP context and the EPS bearer with the second AN based on a third IP addressing version different from the first and second IP addressing versions.

7. A method implemented in a user equipment (UE), the method comprising:
setting a timer in response to migration of the UE from a first access node (AN) to a second AN, wherein the timer is implemented at the UE;
detecting based on the timer, a time-out of a data transfer of an application executing on the UE;
deactivating, in response to the UE detecting the time-out of the data transfer of the application, one of a packet data protocol (PDP) context based on a first internet protocol (IP) addressing version and an evolved packet system (EPS) bearer based on the first IP addressing version, wherein the one of the PDP context and the EPS bearer is associated with the application; and
reactivating the deactivated one of the PDP context and the EPS bearer associated with the application, the deactivated one of the PDP context and the EPS bearer being reactivated with the second AN based on a second IP addressing version different from the first IP addressing version.

8. The method of claim 7, further comprising reactivating the deactivated one of the PDP context and the EPS bearer with the second AN after sending a message to deactivate the one of the PDP context and the EPS bearer.

9. The method of claim 7, further comprising reactivating the deactivated one of the PDP context and the EPS bearer with the second AN in response to determining that the second IP addressing version is supported by the second AN.

10. The method of claim 7, further comprising determining whether the second AN supports the second IP addressing version based on a second application executing on the UE during the migration, wherein the second application is configured to employ the second IP addressing version.

11. The method of claim 10, further comprising determining that the second AN supports the second IP addressing version if a second data transfer of the second application continues after migration of the UE from the first AN to the second AN.

12. The method of claim 7, further comprising deactivating the one of the PDP context and the EPS bearer based on the second IP addressing version in response to detecting a second time-out of the data transfer of the application.

13. The method of claim 12, further comprising reactivating the deactivated one of the PDP context and the EPS bearer with the second AN based on a third IP addressing version different from the first and second IP addressing versions.

14. A non-transitory computer medium storing instructions that, when executed, cause a processor of a user equipment (UE) to perform a method comprising:
setting a tinier in response to migration of the UE from a first access node (AN) to a second AN, wherein the timer is implemented at the UE;
detecting, based on the timer, a time-out of a data transfer of an application on the UE;
deactivating, in response to the UE detecting the time-out of the data transfer of the application, one of a packet data protocol (PDP) context based on a first internet protocol (IP) addressing version and an evolved packet system (EPS) bearer based on the first IP addressing version, wherein the one of the PDP context and the EPS bearer is associated with the application; and
reactivating the deactivated one of the PDP context and the EPS bearer associated with the application, the deactivated one of the PDP context and the EPS bearer being reactivated with the second AN based on a second IP addressing version different from the first IP addressing version.

15. The non-transitory computer medium of claim 14, wherein the method further comprises reactivating the deactivated one of the PDP context and the EPS bearer with the second AN after sending a message to deactivate the one of the PDP context and the EPS bearer.

16. The non-transitory computer medium of claim 14, wherein the method further comprises reactivating the deactivated one of the PDP context and the EPS bearer with the second AN in response to determining that the second IP addressing version is supported by the second AN.

17. The non-transitory computer medium of claim 14, wherein the method further comprises determining whether the second AN supports the second IP addressing version based on a second application executing on the UE during the migration, wherein the second application is configured to employ the second IP addressing version.

18. The non-transitory computer medium of claim 17, wherein the method further comprises determining that the second AN supports the second IP addressing version if a second data transfer of the second application continues after migration of the UE from the first AN to the second AN.

19. The non-transitory computer medium of claim 14, wherein the method further comprises deactivating the one of the PDP context and the EPS bearer based on the second IP addressing version in response to detecting a second time-out of the data transfer of the application.

20. The non-transitory computer medium of claim 19, wherein the method further comprises reactivating the deactivated one of the PDP context and the EPS bearer with the second AN based on a third IP addressing version different from the first and second IP addressing versions.

* * * * *